United States Patent [19]
Kopfer

[11] 3,786,820
[45] Jan. 22, 1974

[54] MIXER AND APPLICATOR FOR FINGERNAIL REPAIR MATERIAL

[76] Inventor: Rudolph J. Kopfer, 137 Almenar Dr., Greenbrae, Calif. 94904

[22] Filed: Feb. 20, 1973

[21] Appl. No.: 333,874

[52] U.S. Cl. .............................................. 132/74.5
[51] Int. Cl. ........................................... A45d 29/18
[58] Field of Search .............. 132/74.5, 73; 23/253; 206/47 A; 128/272, 248, 249, 269

[56] References Cited
UNITED STATES PATENTS

| | | | |
|---|---|---|---|
| 1,131,575 | 3/1915 | Tuttle | 128/269 |
| 2,642,065 | 6/1953 | Negri | 128/269 |
| 3,560,163 | 2/1971 | Mittleman | 128/272 |
| 3,502,088 | 3/1970 | Jarby | 132/73 |
| 1,557,620 | 10/1925 | Robinson | 128/249 |
| 3,347,410 | 10/1967 | Schwartzman | 206/47 A |
| 2,510,490 | 6/1950 | Ager | 128/269 |

Primary Examiner—Antonio F. Guida
Assistant Examiner—Gregory E. McNeill
Attorney, Agent, or Firm—George B. White

[57] ABSTRACT

A transparent tube has on one end a conical tip with abrasive coating thereon capable of use for preparing a fingernail for repair, and has a mixer and applicator extended into its other end; inside the tube is a crushable capsule containing a liquid monomer; within the tube is a polymer in powder form; means being provided to crush the capsule thereby to release the monomer; said mixer being manipulatable to mix said liquid and powder to suitable consistency observable through the transparent tube, and said mixer being withdrawable from said tube for use as an applicator to apply the mixture to the damaged fingernail, said monomer and polymer being capable of forming an auto polymer with a hardening time of about one-half to one and one-half minutes.

16 Claims, 13 Drawing Figures

PATENTED JAN 22 1974 3,786,820

PATENTED JAN 22 1974          3,786,820

MIXER AND APPLICATOR FOR FINGERNAIL REPAIR MATERIAL

BACKGROUND OF THE INVENTION

The herein invention pertains to easy and practical repair of a damaged fingernail in such a way that it will restore the original form and strength of the fingernail.

A feature of the invention is to provide the ingredients for a mixture of such fingernail repair in a unit wherein such ingredients may be stored indefinitely and ready to use, and can be quickly combined and mixed to a desired consistency and applied to the fingernail instantaneously, and to set or harden to fingernail consistency in a very short period of time.

Another feature of the invention is to provide a disposable mixer and applicator unit, a tubular part of which contains a crushable capsule containing a suitable liquid monomer, and a suitable polymer in fine powder form loosely contained and accessible to the liquid monomer when the latter is released from the crushed capsule, and which has as part of the unit a mixer applicator capable of being manipulated within the tubular part to mix said ingredients to the desired consistency and then to be withdrawn for quickly applying the mixture to the damaged fingernail, thus obviating the necessity for separate utensile for release, and mixing and applying repair material.

DETAILED DESCRIPTION

Figure 1:
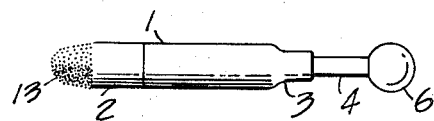
FIG. 1 is a substantially full scale side view of the disposable mixer-applicator unit.

As shown in FIG. 1 the mixer and applicator unit has a tubular body 1 with a plug 2 in one end. The other end is formed into a neck 3 of reduced diameter. A mixer rod 4 is slideable in the neck 3. A handle bulb 6 on the outer end of rod 4 facilitates manipulation.

Figure 2:
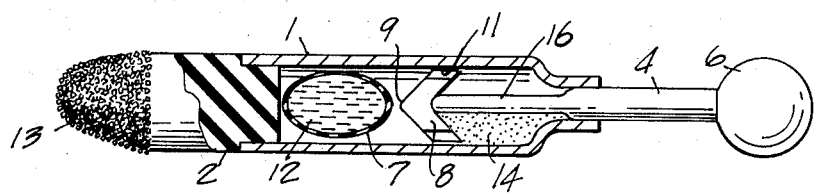
FIG. 2 is a sectional view of the unit on an enlarged scale.

As shown in FIG. 2 a crushable capsule 7 is positioned in the tubular body 1. A crusher 8 is between the capsule 7 and the mixer rod 4. The crusher 8 has a piercing point 9 facing toward the capsule 7 and has passages or perforations 11 therethrough to permit the liquid 12 released from the crushed capsule 7 to flow therethrough toward the mixing rod 4.

The plug 2 has a substantially conical tip 13 covered by abrasive coating, such as grits of carborundum. The tubular body 1 is transparent and contains a suitable polymer powder 14 for mixing with the monomer liquid 12 released from the crushed capsule 7. Thus the consistency of the mixture can be visually observed.

Figure 3:
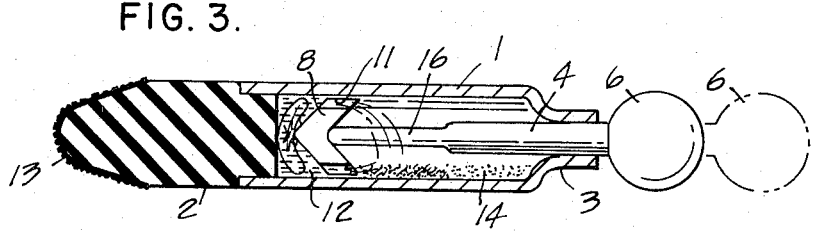
FIG. 3 is a sectional view of the unit during the crushing of the capsule.
Figure 4:
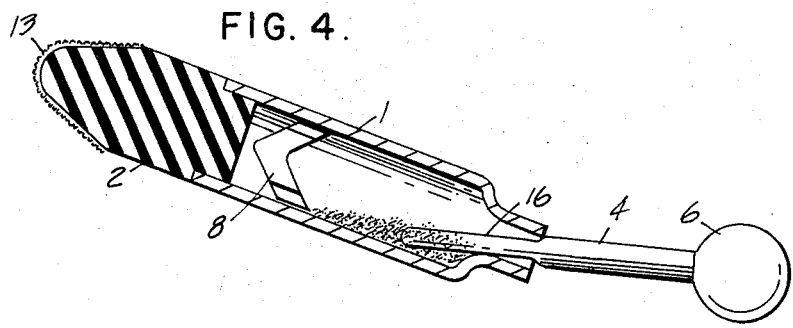
FIG. 4 is a sectional view of the unit during the mixing of the ingredients.

As shown in FIG. 3 the mixing rod 4 is pushed against the crusher 8 which latter pierces and crushes the capsule 7 and releases the monomer liquid 12. The mixing rod 4 has a mixing portion 16 of smaller diameter than the diameter of the neck 3, so that when the mixer rod 4 is withdrawn partly, the reduced portion 16 is positioned in the neck 3, and can be manipulated in the manner shown in FIG. 4 for mixing the liquid and powder together along the inner side of the body 1.

Figure 5:
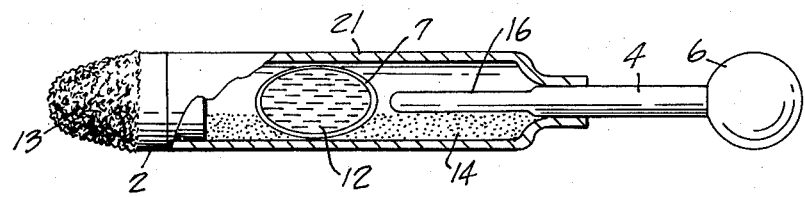
FIG. 5 is a sectional view of a modified form of the unit.
Figure 6:
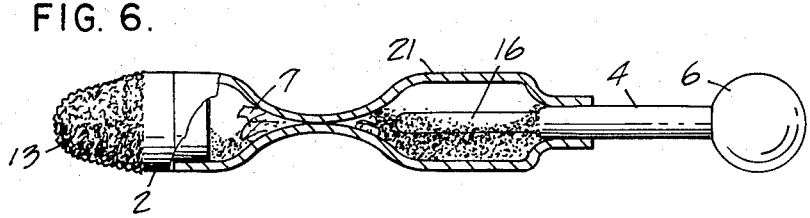
FIG. 6 is a sectional view of said modified unit during the crushing of the capsule.

In the embodiment shown in FIGS. 5 and 6 the tubular body 21 is pliant and collapsible, so that it may be squeezed over the capsule 7 and crush the capsule 7 thereby to squeeze the liquid monomer 12 out of the crushed capsule 7 to the polymer powder for mixing by the mixer rod 4 as heretofore described.

Figure 8:
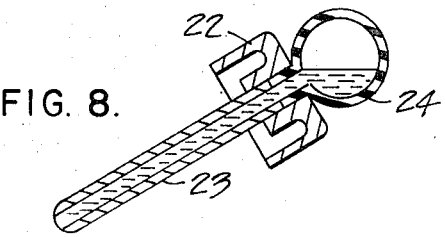
FIG. 8 is a sectional view of the mixer-applicator part of said second modified form.
Figure 7:
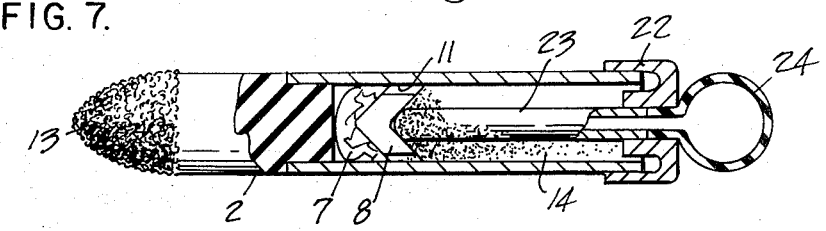
FIG. 7 is a second modified form of the unit.
Figure 9:
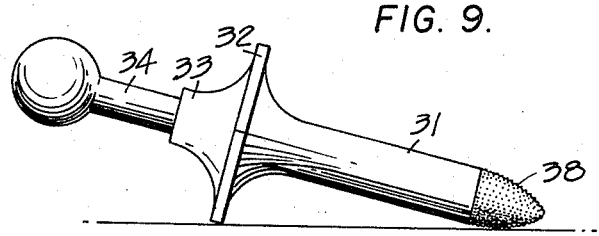
FIG. 9 is a side view of another modified form of the mixer-applicator unit.
Figure 10:
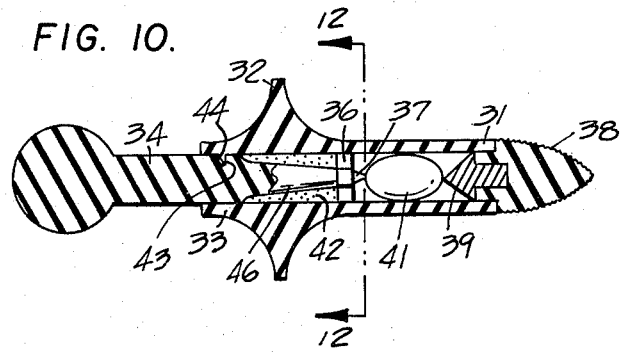
FIG. 10 is a longitudinal sectional view of the form shown in FIG. 9.
Figure 11:
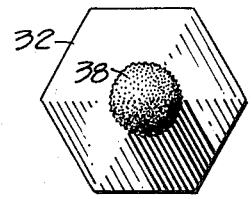
FIG. 11 is an end view of said modified mixer-applicator unit.

The embodiment shown in FIGS. 7 and 8 is the same as that shown in FIGS. 1 – 4, except that instead of the reduced neck 3, the open end is covered by a detachable cap 22 and the mixing rod 23 extended through the cap 22 is hollow and open at both ends. On the outer end of the tubular rod 23 is a resiliently compressible hollow bulb 24, whereby the mixture can be sucked into the tubular rod 23 and then emptied into the damaged nail.

Figure 12:
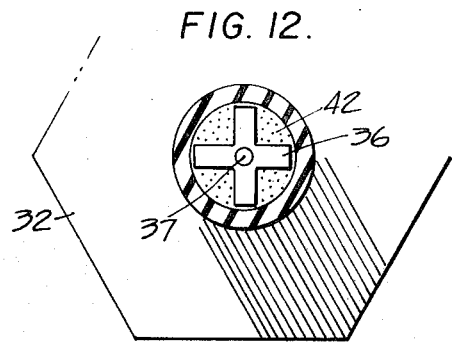
FIG. 12 is a sectional view taken on lines 12—12 of FIG. 10.

On the form shown in FIGS. 9 to 12, the tubular body 31 has an enlarged handle flange 32 of substantially hexagonal circumference to facilitate holding and gripping of the unit. The tubular body 31 extends to one side of the handle flange 32 and a neck 33 extends in the opposite direction from said handle flange 32. The mixer rod 34 is inserted through the neck 33. The mirror end of the mixer rod has a cross shade plunger 36 as shown in FIG. 12 from the center of which extends a piercing point 37. The inner end of the plug 38 has a hard portion, in this form a pointed portion 39 so that when the rod 34 is pushed into the tubular body 31 the capsule 41 is pressed against the pointed end 39 and is pierced and compressed so that the liquid flows from the capsule and flows between the arms of the cross-shaped plunger 36 for intermixing with the polymer powder 42.

In order to prevent accidental operation and provide initial resistance to the amount of the mixer-applicator rod 34 a break-away seal or lock is provided, which in the present illustration is a weakened prong 43 projecting from the inner periphery of the neck 33 into a groove 44 in the periphery of the rod 34. The prong 43 is breakable so that when the rod 34 is forced inwardly it breaks off the prong 43.

The inner portion 46 is reduced in diameter to provide space for the polymer powder 42 as shown. Thus the rod 34 can be used both for piercing and crushing the capsule 41 and also for mixing the ingredients and subsequently can be used as an applicator.

Figure 13:
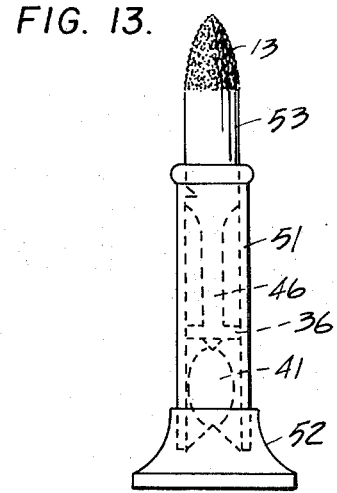
FIG. 13 is a side view of said modified form on a standing base.

In the form shown in FIG. 13 the tubular body 51 has its end inserted in a base 52 so that it may stand in upright position. In this form on the outer end of the mixer-applicator 53 is provided the conical top 13 coated with abrasive. In other respects the mixer-applicator 53 is constructed substantially the same way as the mixer-applicator 34 in the previously described embodiment.

For the purpose of this invention the capsule is crushable impervious plastic, gelatine, celluloid, or wax which may be filled with a monomer in form of liquid, paste or powder.

The combination of the ingredients mixed herein result in polymethylmeth-acrolate, which is quick setting, of fingernail pink color, or white or clear white. The approximate setting time of the mixture is about one-half to one and one-half minutes.

An example of auto polymer used herein is a resin called poly (methyl meth-acrolate).

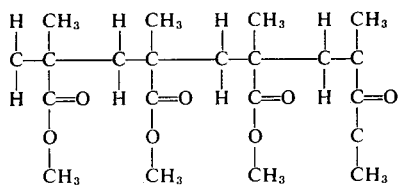

The above autopolymer is produced by additional polymerization in which monomer (liquid) methly methacrylate) is combined, without composition change, with polymer (powder) (poly-methyl methacrylate) in approximately 1:3 ratio to produce giant molecules. This combination is exothermic in nature. The particle size of polymer is extremely fine.

To activate the molecules an initiator (R—COO) such as benzoyl peroxide is added to the polymer, in a maximum concentration of 2 percent. In order to prevent polymerization of the monomer during storage in the unit, an inhibitor such as hydroquinone concentration of 0.006 percent or less or butylated hydroxytoluene is added to the monomer.

The initiator or activator added to the monomer may be also dimethyl-p-toluidine, maximum concentration 0.75 percent, or dimethyl symxylidine. Activators added to the polymer may be p-toluene sulfinic acid or dimethyl m toluidine.

The particle size of the polymer is to be extremely fine. Filters such as glass, fibers, ceramic powder aluminum oxide or the like can be added as desired for texture and color.

The device of this invention is simple in structure and inexpensive to manufacture in quantities; it has the ability to store volatile liquids in its capsule without evaporation and other ingredients in the tube free from atmospheric contamination; it affords quick mixing of ingredients within the device itself to any desired consistency; it combines a complete system for fingernail repair, namely the abrasive tip to prepare the fingernail for the mixture, the combining of the ingredients completely within the tubular body, and the instant withdrawal of the mixer and its use as applicator of the mixture on the fingernail, resulting in rigid fingernails.

We claim:

1. A mixer and applicator for fingernail repair material comprising,
    a tubular body,
    means to cover one end of said body,
    an impervious crushable capsule in said body containing ingredients for forming an autopolymer,
    said tube containing the remaining ingredients to act with the first mentioned ingredients to produce the autopolymer in a form applicable to broken fingernail,
    a mixer covering the opening at the other end of said tube and being manipulatable for mixing said ingredients, and being withdrawable from said tube to apply the mixed polymer to a fingernail.

2. The mixer and applicator for fingernail repair material specified in claim 1, and
    means to crush said capsule at will for releasing its contents into said tubular body, 3. The mixer and applicator for fingernail repair material specified in claim 2, and
    said mixer being a reciprocable rod of smaller diameter than the inner diameter of said tubular body,
    and a manipulating handle member on said rod.

4. The mixer and applicator for fingernail repair material specified in claim 3, and
    said rod being hollow and open at both ends, and
    said handle member being resiliently compressible for sucking in and expelling the repair material at will.

5. The mixer and applicator for fingernail repair material specified in claim 3, and
    a plunger element in said tubular body having a piercing point for crushing said capsule and being positioned between said capsule and said rod to be forced by said rod against said capsule for releasing the contents of said capsule into said tubular body.

6. The mixer and applicator for fingernail repair material specified in claim 5, and
    said plunger element being perforated for squeezing the material released from the crushed capsule through the perforations toward said mixing rod.

7. The mixer and applicator for fingernail repair material specified in claim 3, and
    said tubular body being pliant and compressible for crushing said capsule by squeezing said tubular body against said capsule thereby releasing the contents of said capsule into the tubular body.

8. The mixer and applicator for fingernail repair material specified in claim 2, and
    said covering means for said one end of said body including a substantially conical tip covered by abrasive coating for preparing the nail for the mixed autopolymer.

9. The mixer and applicator for fingernail repair material specified in claim 1, and
    said ingredients in said capsule being a monomer liquid methyl methacrylate and said remaining ingredient in said tube being a polymer poly-methil methacrylate in powder form.

10. The mixer and applicator for fingernail repair material specified in claim 9, and
    said monomer ingredient in said capsule containing an inhibitor to inhibit polymerization within the capsule.
    and said polymer ingredient in said tube containing an activator.

11. The mixer and applicator for fingernail repair material specified in claim 10, and
    said inhibitor being from the class of hydroquinone and butylated hydroxytoluene, and
    said activator being from the class of dimethyl = p - toloidine, dimethyl symxylidine, p - tolune sulfinic acid, dimethyl m toluidine.

12. The mixer and applicator for fingernail repair material specified in claim 11, and said inhibitor being 0.006 percent or less by weight, and said activator being 0.75 percent or less by weight.

13. The mixer and applicator for fingernail repair material specified in claim 11, and
the particle size of said polymer being extremely fine.

14. The mixer and applicator for fingernail repair material specified in claim 1, and
said tubular body being transparent thereby to afford visual observation of mixture consistency therein.

15. The mixer and applicator for fingernail repair material specified in claim 10, and
said activator added to said polymer being from the class of p- toluene sulfinic acid, dimethyl m toluidine.

16. The mixer and applicator for fingernail repair material specified in claim 15, and
an activator added to the monomer, said last mentioned activator being from the class of dimethyl-p-toluidine, maximum concentration 0.75 percent, dimethyl symxylidine.

* * * * *